US008810849B2

(12) United States Patent
Matsuhashi

(10) Patent No.: US 8,810,849 B2
(45) Date of Patent: Aug. 19, 2014

(54) PRINTING METHOD, PRINTING APPARATUS, AND PRINT PRODUCING METHOD BASED ON PRINTABLE PRINTING AREA AND SIZE OF THE LARGE PRINTS

(75) Inventor: Kunihiko Matsuhashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1371 days.

(21) Appl. No.: 12/231,507

(22) Filed: Sep. 3, 2008

(65) Prior Publication Data

US 2009/0056583 A1 Mar. 5, 2009

(30) Foreign Application Priority Data

Sep. 3, 2007 (JP) ................................ 2007-228088
Jun. 13, 2008 (JP) ................................ 2008-155701

(51) Int. Cl.
*G06K 15/02* (2006.01)

(52) U.S. Cl.
USPC ............ 358/1.2; 358/1.18; 358/1.1; 400/582; 400/61; 400/619; 399/395

(58) Field of Classification Search
USPC ............. 358/1.2, 1.18, 1.1; 400/582, 61, 619; 399/395
See application file for complete search history.

(56) References Cited

U.S. PATENT DOCUMENTS 5,559,934 A * 9/1996 Ogura et al. ................. 358/1.18
6,106,170 A * 8/2000 Watanabe et al. ............... 400/61
2004/0212825 A1* 10/2004 Sai et al. ...................... 358/1.15
2005/0012950 A1* 1/2005 Kurashina .................... 358/1.12
2006/0222431 A1* 10/2006 Kato et al. .................... 400/621
2007/0024913 A1* 2/2007 Jeong .......................... 358/3.24

FOREIGN PATENT DOCUMENTS

JP 2003-291426 10/2003

* cited by examiner

*Primary Examiner* — Benny Q Tieu
*Assistant Examiner* — Martin Mushambo
(74) *Attorney, Agent, or Firm* — Nutter McClennen & Fish LLP; John J. Penny, V.

(57) ABSTRACT

A printing method that alternately repeats a transport operation that transports a continuous medium in a transport direction and an image forming operation that moves a head to form an image to thereby print out a first image and a second image, which has a smaller length in the transport direction than the first image, on the continuous medium. The printing method includes: setting a unit area, which is equal to or smaller than the size of a printing area that is printable through the one image forming operation, on the basis of the printable printing area and the size of the first image; generating print data for the unit area such that, within the unit area, an integer number of the first images are aligned at a first spacing in the transport direction, an integer number of the second images are aligned at a second spacing in the transport direction, and the integer number of the first images aligned in the transport direction and the integer number of the second images aligned in the transport direction are printed so as to be aligned in a width direction that intersects with the transport direction; and performing printing using the print data repeatedly so that, on the continuous medium, a plurality of the first images are aligned at the first spacing in the transport direction and a plurality of the second images are aligned at the second spacing in the transport direction.

8 Claims, 13 Drawing Sheets

| | FIRST PRINTING PROCESS | | SECOND PRINTING PROCESS | | THIRD PRINTING PROCESS | |
|---|---|---|---|---|---|---|
| | PRINT A PRINT B | PRINT C PRINT D | PRINT A PRINT C | PRINT B PRINT D | PRINT A PRINT D | PRINT B PRINT C |
| NUMBER OF PRINTS IN TRANSPORT DIRECTION | A: 11 B: 17 | C: 17 D: 27 | A: 11 C: 17 | B: 17 D: 27 | A: 11 D: 27 | B: 17 C: 17 |
| FEEDING LENGTH (mm) | 913 | 901 | 913 | 901 | 913 | 901 |
| MARGIN AREA IN TRANSPORT DIRECTION ($mm^2$) | 1810 | 1199 | 1448 | 799 | 2637 | 0 |
| NUMBER OF PRINTS ALIGNED IN WIDTH DIRECTION | A: 2 B: 3 | C: 4 D: 3 | A: 2 C: 4 | B: 3 D: 2 | A: 2 D: 3 | B: 3 C: 3 |
| MARGIN LENGTH IN WIDTH DIRECTION (mm) | 1 | 25 | 28 | 41 | 31 | 30 |
| MARGIN AREA IN WIDTH DIRECTION ($mm^2$) | 913 | 22, 525 | 25, 564 | 36, 941 | 28, 303 | 27, 030 |
| TOTAL MARGIN AREA ($mm^2$) | 26, 438 | | 64, 745 | | 57, 973 | |

FIRST PRINTING PROCESS

SECOND PRINTING PROCESS

THIRD PRINTING PROCESS

FIG. 11

| | FIRST PRINTING PROCESS | | SECOND PRINTING PROCESS | | THIRD PRINTING PROCESS | |
|---|---|---|---|---|---|---|
| | PRINT A PRINT B | PRINT C PRINT D | PRINT A PRINT C | PRINT B PRINT D | PRINT A PRINT D | PRINT B PRINT C |
| NUMBER OF PRINTS IN TRANSPORT DIRECTION | A: 11 B: 17 | C: 17 D: 27 | A: 11 C: 17 | B: 17 D: 27 | A: 11 D: 27 | B: 17 C: 17 |
| FEEDING LENGTH (mm) | 913 | 901 | 913 | 901 | 913 | 901 |
| MARGIN AREA IN TRANSPORT DIRECTION ($mm^2$) | 1810 | 1199 | 1448 | 799 | 2637 | 0 |
| NUMBER OF PRINTS ALIGNED IN WIDTH DIRECTION | A: 2 B: 3 | C: 4 D: 3 | A: 2 C: 4 | B: 3 D: 2 | A: 2 D: 3 | B: 3 C: 3 |
| MARGIN LENGTH IN WIDTH DIRECTION (mm) | 1 | 25 | 28 | 41 | 31 | 30 |
| MARGIN AREA IN WIDTH DIRECTION ($mm^2$) | 913 | 22, 525 | 25, 564 | 36, 941 | 28, 303 | 27, 030 |
| TOTAL MARGIN AREA ($mm^2$) | 26, 438 | | 64, 745 | | 57, 973 | |

PRINTING METHOD, PRINTING APPARATUS, AND PRINT PRODUCING METHOD BASED ON PRINTABLE PRINTING AREA AND SIZE OF THE LARGE PRINTS

BACKGROUND

1. Technical Field

The invention relates to a printing method, a printing apparatus and a print producing method.

2. Related Art

Some printing apparatuses print out a large number of unit images on a continuous medium (for example, roll of paper). In the above printing apparatuses, unit images are printed so that they are aligned in a continuous direction in which the medium is continuous. A known typical printing apparatus among those printing apparatuses alternately repeats a transport operation in which a continuous medium is transported in the continuous direction and an image forming operation in which a head forms an image on the continuous medium transported to a printing area while the head is being moved.

The above printing apparatus defines an area (maximum printing area) on a continuous medium, which is printable through one image forming operation. For this reason, a printing apparatus has been suggested, which determines the size of an area printed through one image forming operation on the basis of the maximum number (N) of unit images that can be printed in the maximum printing area. According to the above printing apparatus, N unit images are printed through one image forming operation without leaving a margin in a direction in which a continuous medium is continuous (see JP-A-2003-291426).

The printing apparatus described in JP-A-2003-291426, however, leaves a margin in the width direction of the continuous medium having a predetermined width.

SUMMARY

An advantage of some aspects of the invention is that it minimizes a margin of a continuous medium.

An aspect of the invention provides a printing method that alternately repeats a transport operation that transports a continuous medium in a transport direction and an image forming operation that moves a head to form an image to thereby print out a first image and a second image, which has a smaller length in the transport direction than the first image, on the continuous medium. The printing method includes: setting a unit area, which is equal to or smaller than the size of a printing area that is printable through the one image forming operation, on the basis of the printable printing area and the size of the first image; generating print data for the unit area such that, within the unit area, an integer number of the first images are aligned at a first spacing in the transport direction, an integer number of the second images are aligned at a second spacing in the transport direction, and the integer number of the first images aligned in the transport direction and the integer number of the second images aligned in the transport direction are printed so as to be aligned in a width direction that intersects with the transport direction; and performing printing using the print data repeatedly so that, on the continuous medium, a plurality of the first images are aligned at the first spacing in the transport direction and a plurality of the second images are aligned at the second spacing in the transport direction.

Other aspects of the invention may be apparent from the specification and the accompanying drawings.

BRIEF DESCRIPTION OF THE DRAWINGS

The invention will be described with reference to the accompanying drawings, wherein like numbers reference like elements.

FIG. 11 is a table that shows results obtained by calculating the amounts of margin in the respective printing processes.

DESCRIPTION OF EXEMPLARY EMBODIMENTS

Overview of Disclosure

Figure 1:
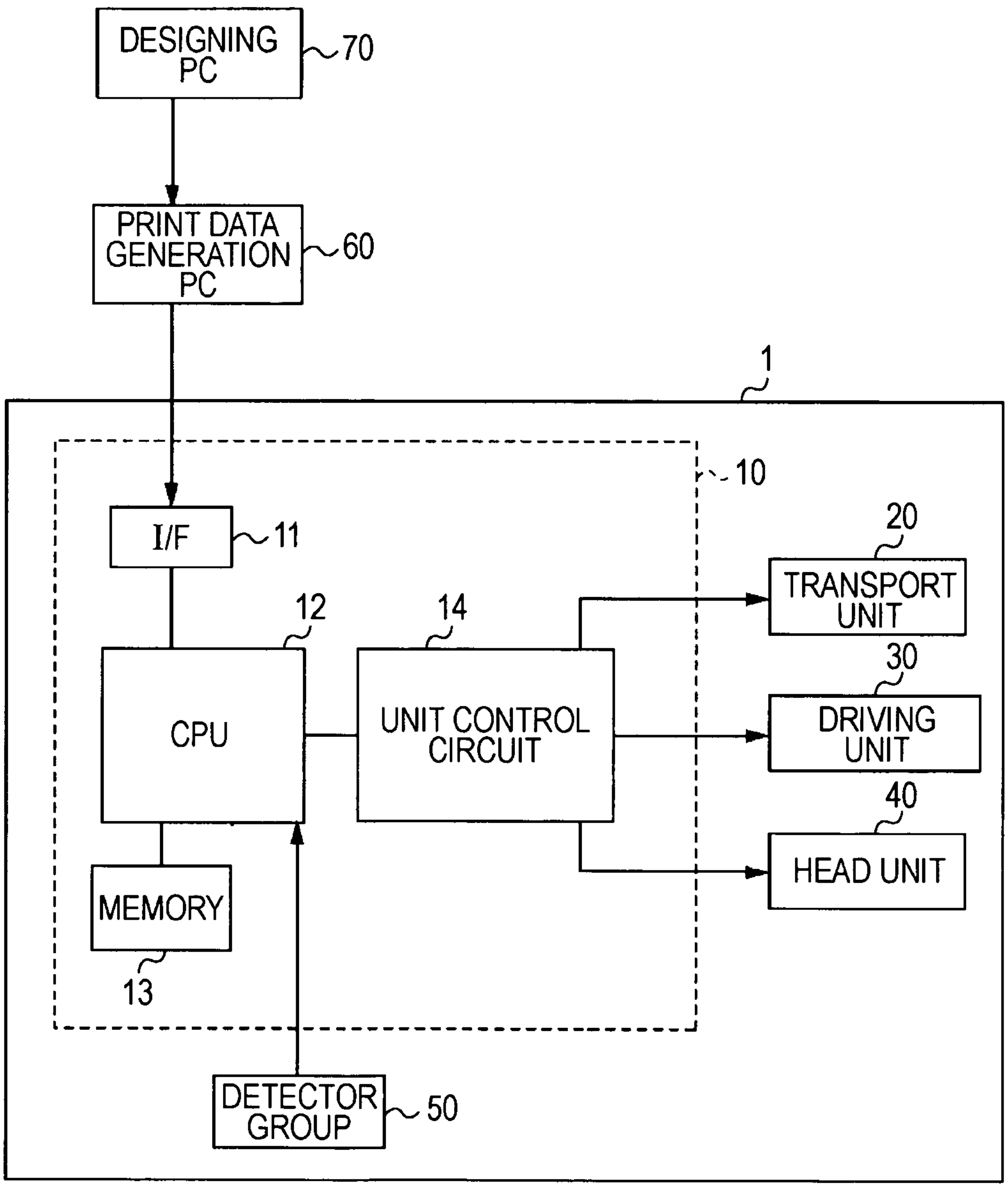
FIG. 1 is a block diagram of a configuration of a printing system.

According to the description in the specification and the accompanying drawings, at least the following aspects will become apparent.

One of the aspects implements a printing method that alternately repeats a transport operation that transports a continuous medium in a transport direction and an image forming operation that moves a head to form an image to thereby print out a first image and a second image, which has a smaller length in the transport direction than the first image, on the continuous medium. The printing method includes: setting a unit area, which is equal to or smaller than the size of a printing area that is printable through the one image forming operation, on the basis of the printable printing area and the size of the first image; generating print data for the unit area such that, within the unit area, an integer number of the first images are aligned at a first spacing in the transport direction, an integer number of the second images are aligned at a second spacing in the transport direction, and the integer number of the first images aligned in the transport direction and the integer number of the second images aligned in the transport direction are printed so as to be aligned in a width direction that intersects with the transport direction; and performing printing using the print data repeatedly so that, on the continuous medium, a plurality of the first images are aligned at the first spacing in the transport direction and a plurality of the second images are aligned at the second spacing in the transport direction.

According to the above printing method, it is possible to perform printing on a continuous medium having a predetermined width with a minimized amount of margin in the width direction. It is not necessary to stock continuous media having different widths to conform to sizes of images for a reduced amount of margin in the width direction. In addition, by determining a unit area on the basis of the size of the first image, it is possible to reduce the amount of margin of a continuous medium in the transport direction. If a unit area is determined on the basis of the size of the second image, when another one first image can be printed in a little bit larger unit area, a margin in the transport direction is larger than that when a unit area is determined on the basis of the size of the first image.

In the above printing method, the length of the first spacing may be equal to or smaller than the length of the second spacing. According to the above printing method, it is possible to avoid an unnecessary increase in unit area. As a result, the amount of continuous medium consumed is suppressed, and print time is also reduced.

In the above printing method, when the print data are generated, after determining the integer number of the first images, of which the length is larger in the width direction than the second image, that are printed so as to be aligned in the width direction, the integer number of the second images that are printed so as to be aligned in the width direction may be determined. According to the above printing method, it is possible to perform printing on a continuous medium with a reduced amount of margin in the width direction. For example, if the small second image may be printed in a margin area that remains when the maximum integer number of the first images that can be printed in the width direction of a continuous medium, the amount of margin may be reduced.

In the above printing method, the integer number of the first images that are printed so as to be aligned in the width direction may be determined so that the total of the lengths in the width direction of the first images that are aligned in the width direction is smaller than a predetermined threshold. According to the above printing method, for example, when images are cut off from a continuous medium using a cutting die after printing, it is possible to cut off images fairly by suppressing the width of the cutting die to a predetermined width (predetermined threshold).

In the above printing method, when multiple types of images are printed, combinations of the types of images to be printed on the continuous medium may be selected from among the multiple types of images, wherein the amount of margin that remains when images are printed on the continuous medium may be calculated for each combination, and wherein printing may be performed on the basis of the combination of which the amount of margin is minimal. According to the above printing method, it is possible to perform printing on a continuous medium with a minimized amount of margin.

Another one of the aspects implements a printing apparatus that alternately repeats a transport operation that transports a continuous medium in a transport direction and an image forming operation that moves a head to form an image to thereby print out a first image and a second image, which has a smaller length in the transport direction than the first image, on the continuous medium. The printing apparatus includes: a unit area setting unit that sets a unit area, which is equal to or smaller than a size of a printing area that is printable through the one image forming operation, on the basis of the printable printing area and the size of the first image; a print data generation unit that generates print data for the unit area such that, within the unit area, an integer number of the first images are aligned at a first spacing in the transport direction, an integer number of the second images are aligned at a second spacing in the transport direction, and the integer number of the first images aligned in the transport direction and the integer number of the second images aligned in the transport direction are printed so as to be aligned in a width direction that intersects with the transport direction; and a printing unit that performs printing using the print data repeatedly so that, on the continuous medium, a plurality of the first images are aligned at the first spacing in the transport direction and a plurality of the second images are aligned at the second spacing in the transport direction. According to the above printing apparatus, it is possible to perform printing on a continuous medium with a minimized amount of margin.

Yet another one of the aspects implements a print producing method that alternately repeats a transport operation that transports a continuous medium in a transport direction and an image forming operation that moves a head to form an image to thereby print out a first print and a second print, which has a smaller length in the transport direction than the first print, on the continuous medium. The print producing method includes: setting a unit area, which is equal to or smaller than a size of a printing area that is printable through the one image forming operation, on the basis of the printable printing area and the size of the first print; generating print data for the unit area such that, within the unit area, an integer number of the first prints are aligned at a first spacing in the transport direction, an integer number of the second prints are aligned at a second spacing in the transport direction, and the integer number of the first prints aligned in the transport direction and the integer number of the second prints aligned in the transport direction are printed so as to be aligned in a width direction that intersects with the transport direction; and performing printing using the print data repeatedly so that, on the continuous medium, a plurality of the first prints are aligned at the first spacing in the transport direction and a plurality of the second prints are aligned at the second spacing in the transport direction. According to the above print producing method, it is possible to perform printing on a continuous medium with a minimized amount of margin.

Ink Jet Printer

Hereinafter, a printing system in which an ink jet printer that prints out unit images and a print data generation PC that generates print data are connected to each other will be described as an example of a "printing apparatus".

The ink jet printer (hereinafter, printer 1) prints out a unit image that will be cut off later, such as a "sticky label print" affixed on a wrap film for a fresh food, for example, on a print tape, which serves as a continuous medium, in an ink jet manner. Note that the print tape is formed of a sticker paper and a release paper. The sticker paper has an adhesive surface on the back side of a printing surface. The release paper is covered with the adhesive surface. Images, which are used to form prints, are printed in a direction in which the print tape is continuous. The prints that are continuously printed on the print tape are provided for the user. The sticker paper and the release paper may be cut off together (full cutting) so that the prints are separately cut one by one with a cutting machine, which is an external apparatus. Alternatively, only the sticker paper may be cut (half cutting) without cutting the release paper so that each print may be separated from the release paper.

Figure 2A:
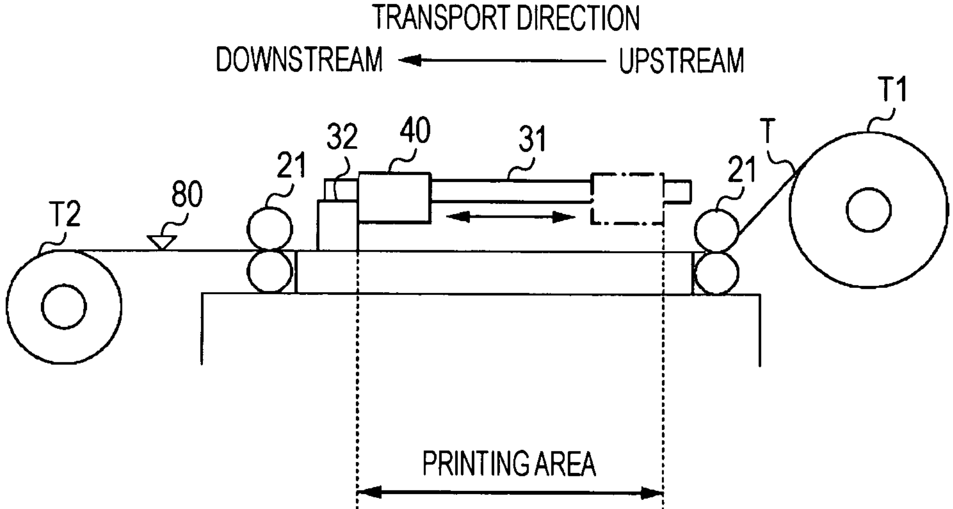
FIG. 2A is a schematic cross-sectional view of a printer.
Figure 2B:
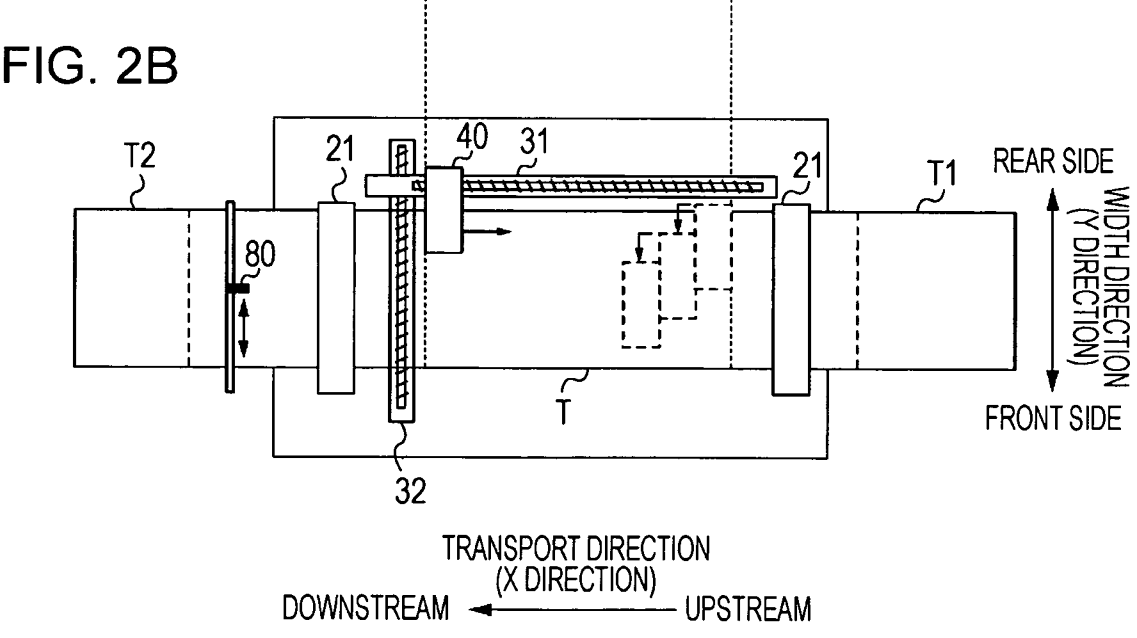
FIG. 2B is a schematic top view of the printer.

FIG. 1 is a block diagram of a configuration of the printing system. FIG. 2A is a schematic cross-sectional view of the printer 1. FIG. 2B is a schematic top view of the printer 1. Initially, designs of prints are created using a designing PC 70, and image data of the created prints are transmitted to a print data generation PC 60. The print data generation PC 60 performs a layout task that determines how images of the prints are printed on the print tape T, converts the image data of arranged prints into print data that the printer 1 is able to print, and then transmits the print data to the printer 1. As the printer 1 receives print data, the printer 1 controls various units (a transport unit 20, a driving unit 30, and a head unit 40) using a controller 10 and then forms images on the print tape T. Note that a detector group 50 monitors the status of the printer 1 and the controller 10 controls various units on the basis of detected results.

The transport unit 20 transports the print tape T in a direction in which the print tape T is continuous (hereinafter, referred to as transport direction) from the upstream side to the downstream side. The transport roller 21 is driven by a motor to feed an unprinted roll print tape T1 to a printing area, and then a take-up mechanism takes up a printed print tape T2 in a roll shape. Note that, in the printing area during printing, the lower side of the print tape T is vacuumed, so that the print tape is held at a predetermined position.

The driving unit 30 adjustably moves the head unit 40 in an X direction that corresponds to the transport direction and a Y direction that corresponds to the width direction of the print tape T. The driving unit 30 is constituted of an X-axis stage 31 that allows the head unit 40 to move in the X direction, a Y-axis stage 32 that allows the X-axis stage 31 to move in the Y direction, and a motor that moves the head unit 40 and the X-axis stage 31.

The head unit 40 is used to form an image and includes a plurality of heads 41. A plurality of nozzles, which serve as ink discharging portions, are provided on the bottom face of each head 41, and each of the nozzles is provided with an ink chamber in which ink is contained.

Figure 3:
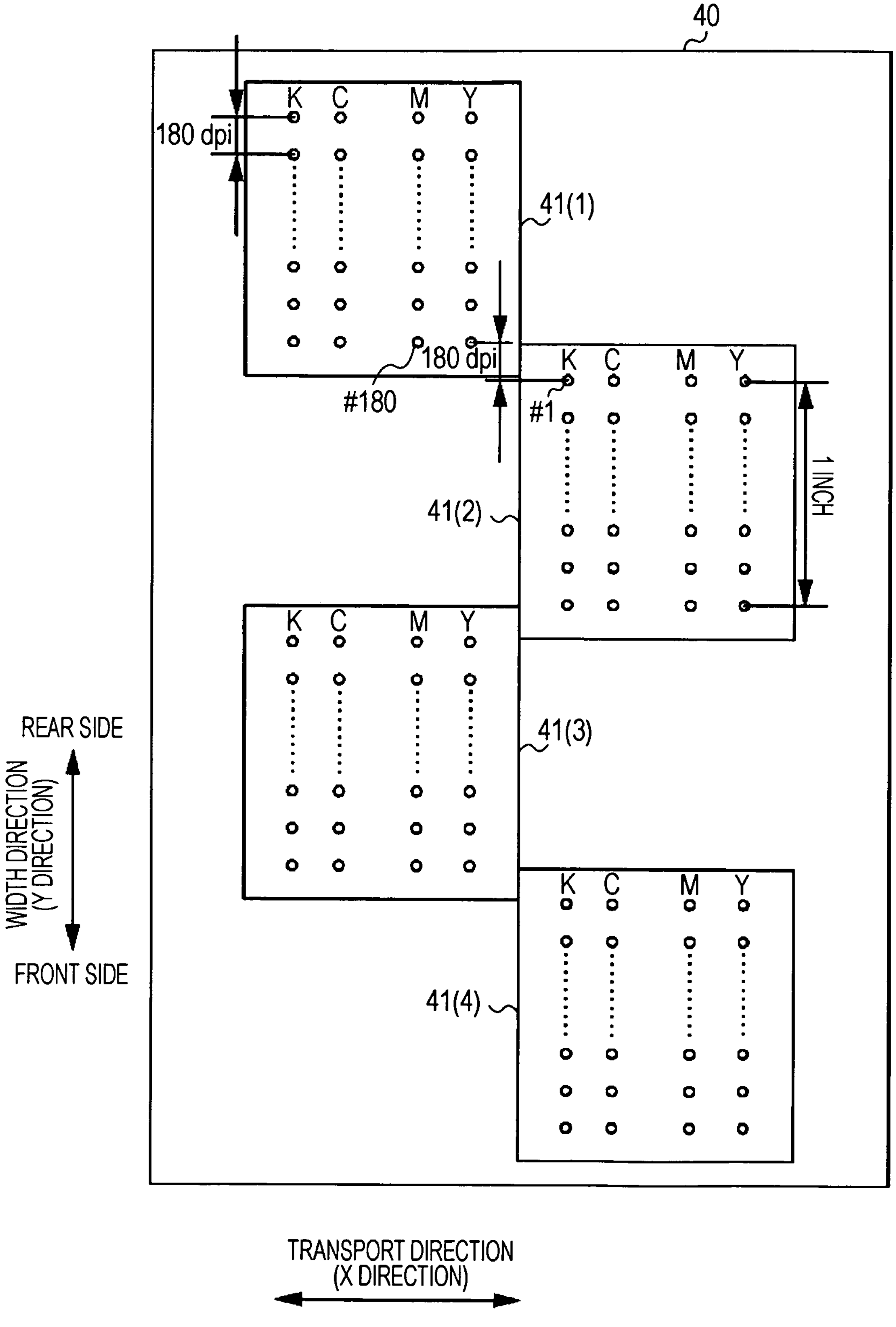
FIG. 3 is a view that shows nozzle arrays formed on the bottom face of a head unit.

FIG. 3 is a view that shows nozzle arrays formed on the bottom face of the head unit 40. The head unit 40 includes four heads 41, and the four heads 41 are aligned in the width direction in a staggered manner. Then, a yellow ink nozzle array Y, a magenta ink nozzle array M, a cyan ink nozzle array C and a black ink nozzle array K are formed on the bottom faces of the heads 41, respectively. Each nozzle array has 180 nozzles, which are aligned at a predetermined interval (180 dpi) in the width direction. In addition, the interval between the frontmost nozzle #180 of the rear side head 41(1), out of the two adjacent heads in the width direction (for example, 41(1) and 41(2)), and the rearmost nozzle #1 of the front side head 41(2) is also 180 dpi. That is, on the bottom face of the head unit 40, the nozzles are aligned at a predetermined interval (180 dpi) over the length of 4 inches in the width direction.

Next, a printing process will be described. First, the head unit 40 is moved by the X-axis stage 31 in the X direction (transport direction) while discharging ink from nozzles to the print tape T that is fed to the printing area by the transport unit 20. Thus, arrays of dots are formed on the print tape T in the X direction. After that, the head unit 40 is moved by the Y-axis stage 32 through the X-axis stage 31 in the Y direction (width direction), and then the head unit 40 is moved in the X direction while performing printing. In this way, by alternately repeating a dot forming operation through movement of the head unit 40 in the X direction and movement of the head unit 40 in the Y direction, dots may be formed at positions that are different from the positions of the dots formed by the preceding dot forming operation to thereby complete forming an image. As printing (image forming operation) of the print tape T fed to the printing area is complete, an unprinted area of the print tape T is fed to the printing area by the transport unit 20 (transport operation) to form an image again. By alternately repeating the image forming operation and the transport operation of the print tape T, a large number of prints are printed on the print tape T so that they are aligned in the transport direction.

Print Production Flow

Figure 4A:
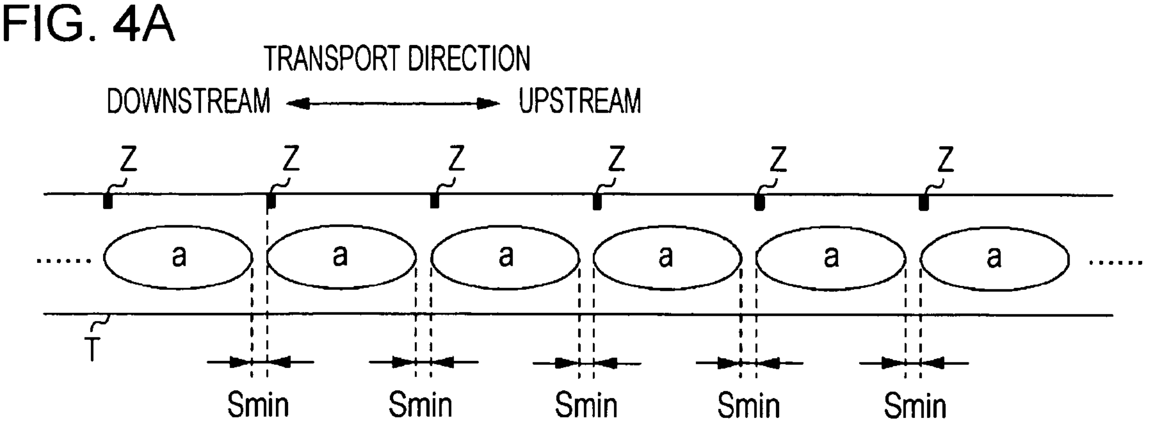
FIG. 4A is a view that shows a state in which prints a are printed on a print tape.
Figure 4B:
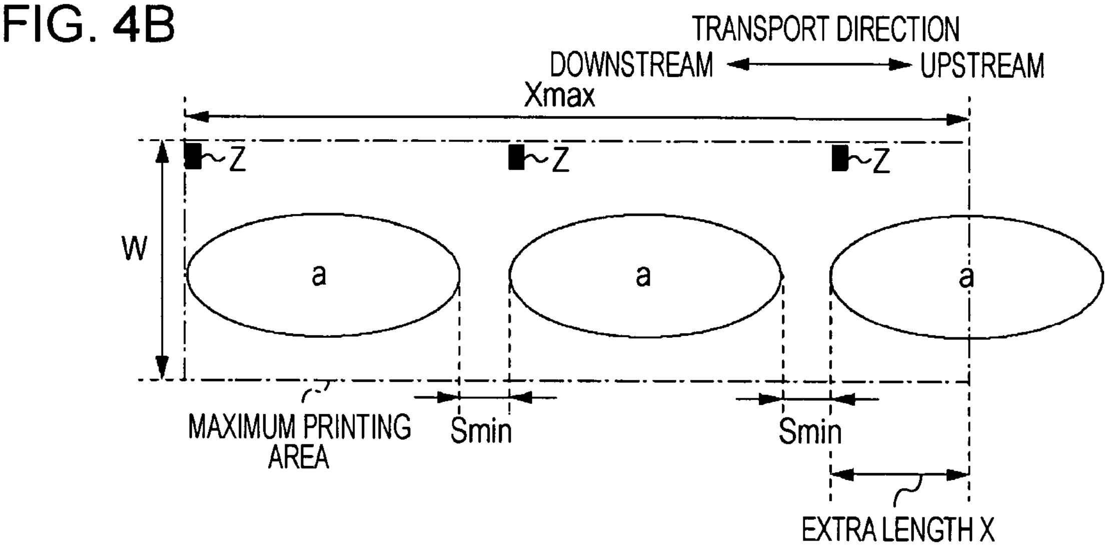
FIG. 4B is a view that shows the number of prints a that can be printed in a maximum printing area.

FIG. 4A is a view that shows a state in which prints a are printed on a print tape T. FIG. 4B is a view that shows the number of prints a that can be printed in a maximum printing area (area surrounded by alternate long and short dashed lines. Hereinafter, the flow until prints a are produced (printed) will be described. As the designing PC 70 receives data (such as image data and the number of copies; hereinafter referred to as JOB data) regarding the designed print a, the print data generation PC 60 generates print data for making the printer 1 print out a specified number of the prints a.

The printer 1 of the present embodiment alternately repeats a transport operation that transports the print tape T and an image forming operation performed by the head unit 40 to thereby perform printing, so that a printing area (hereinafter, referred to as maximum printing area) that can be printed through one image forming operation is determined in advance. The length of the maximum printing area in the width direction is determined depending on the print tape T, and the length of the maximum printing area in the transport direction is a maximum distance Xmax over which the head unit 40 is able to reciprocally move in the transport direction.

One image forming operation must print an integer number of prints a. This is because, as shown in FIG. 4B, if a preceding image forming operation prints out two and half prints a and then the following image forming operation prints out the remaining half of the print a and other two prints a, images may overlap or a gap may occur to form a line at the boundary portion of the print a that is printed through two separate operations when an error occurs in the transport operation for the print tape T. Thus, one image forming operation will print an integer number of prints.

As shown in FIG. 4A, prints a are printed so that they are aligned at an equal spacing of Smin in the transport direction. This allows a cutting machine to half-cut each of the prints that are printed on the print tape T at a certain time interval. In addition, by arranging the prints a at equal spacings in the transport direction, a sticking machine for prints, as well as a cutting machine, is able to peel off prints at predetermined time intervals. Furthermore, in order to prevent a cutting machine from half-cutting the print tape T at a wrong position, "cutting marks Z" that indicate the positions of prints a are also printed on the print tape T together with the prints a. Detecting the cutting marks Z by a sensor allows checking whether prints are printed so that they are aligned at equal spacings. Note that the cutting marks Z are printed so that the downstream distal end of each print a in the transport direction coincides with the position of the downstream end of the corresponding cutting mark Z in the transport direction.

In consideration of the above, the print data generation PC 60 determines the size of an area in which printing is performed through one image forming operation (hereinafter, referred to as unit area) and then determines how prints a are printed in the unit area (layout task). The layout task is executed in accordance with a layout software program in the print data generation PC. Hereinafter, the layout task will be described in detail.

At first, the print data generation PC 60 calculates how may prints a can be printed in a maximum printing area that can be printed through one image forming operation. Prints a are printed at equal spacings in the transport direction as described above. This is because the print tape T is unnecessarily consumed if the spacings of the prints a in the transport direction are increased. For this reason, it is desirable that the spacings of prints a in the transport direction are minimized and, here, the spacings are set to necessary minimum spacings Smin for half-cutting.

Here, it is assumed that, as shown in FIG. 4B, it is calculated that two and half prints a can be printed in the maximum printing area so that they are aligned at a minimum spacing of Smin in the transport direction. In this case, the number of prints a that are printed through one image forming operation is determined to be a maximum integer number within the number of prints (two and half) that can be printed in the maximum printing area, that is, two. Note that the number of prints that can be printed through one image forming operation may be calculated through actually arranging image data of the prints a on image data corresponding to the maximum printing area or may be calculated through computing on the basis of the size of the maximum printing area and the size of the print a.

Figure 4C:
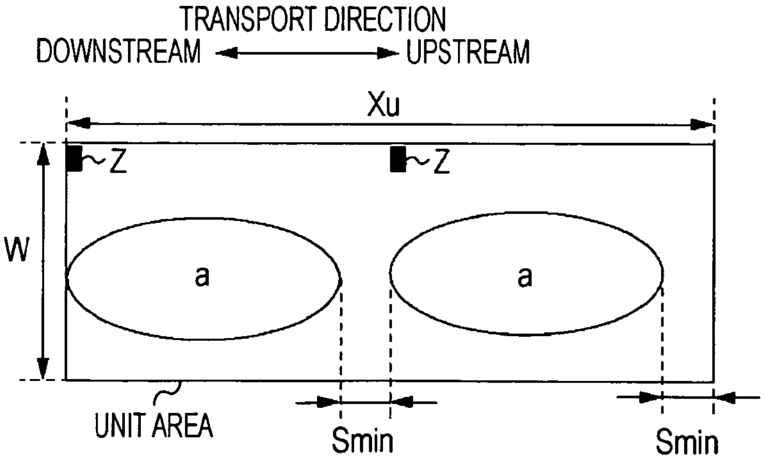
FIG. 4C is a view that shows prints a that are printed in a unit area.

FIG. 4C is a view that shows the prints a that are printed in the unit area (indicated by solid line). After the number of prints printed through one image forming operation (two) has been determined, the size of the unit area will be set. As shown in FIG. 4B, when two prints a are aligned at a minimum spacing Smin in the transport direction and the minimum spacing Smin is provided on the upstream side of each print a in the transport direction within the maximum printing area, an extra length X' arises in the transport direction of the maximum printing area. A length Xu that is obtained by subtracting the extra length X' from the length Xmax of the maximum printing area in the transport direction corresponds to the length of the unit area in the transport direction.

Then, by repeatedly printing images for the unit area, shown in FIG. 4C, in the transport direction, each spacing between the upstream preceding print a of the unit area and the downstream following print a of the unit area is a minimum spacing Smin. Thus, as shown in FIG. 4A, prints a are printed on the print tape T so that they are aligned at a certain spacing of Smin in the transport direction.

When the layout task that determines the size of the unit area and how the prints a are printed in each unit area is complete, image data (hereinafter, referred to as unit area image data) of an image (FIG. 4C) to be printed in the unit area are converted by a printer driver into print data (hereinafter, referred to as unit area print data) that the printer 1 is able to print out. First, the resolution of the unit area image data is converted into a resolution that the printer 1 is able to print out. Then, a color conversion process is performed so that the unit area image data, which are RGB data, are represented by a color space corresponding to the inks (CMYK) of the printer 1. Then, the unit area image data, which have the large number of addressable luminance levels (for example, 256 levels of gray scale), are converted into data of the number of addressable luminance levels (for example, 4 levels of gray scale) that the printer 1 is able to form (halftone processing), and then the resulting data are sorted in conformity with the order in which the printer 1 prints out (raster line processing). Through these processings, the unit area print data, together with command data (the amount by which the print tape T is transported, and the like) according to a printing manner, are transmitted from the printer driver (print data generation PC 60) to the printer 1.

Then, during one image forming operation, printing is performed using the unit area print data repeatedly so as to print out the image shown in FIG. 4C repeatedly. In addition, the amount by which the print tape T is fed through one transport operation is the length Xu of the unit area in the transport direction. That is, the distance over which the heads 41 are moved in the transport direction through image forming operation is the length Xu of the unit area in the transport direction. In this way, by setting the unit area so that prints are printed so as to be aligned at a minimum spacing Smin in the transport direction, it is possible to reduce the distance Xu, over which the head 41 are moved in the transport direction, below the maximum distance Xmax, over which the heads 41 are movable in the transport direction, depending on the size of a print. This reduces print time. In addition, because printing is performed so that the downstream distal end position of each print a coincides with the downstream distal end position of the corresponding cutting mark Z in the transport direction, the cutting marks Z may also be used as marks when the transport unit 20 transports the print tape T.

Printing Multiple Types of Prints: First Example Embodiment

Figure 5A:
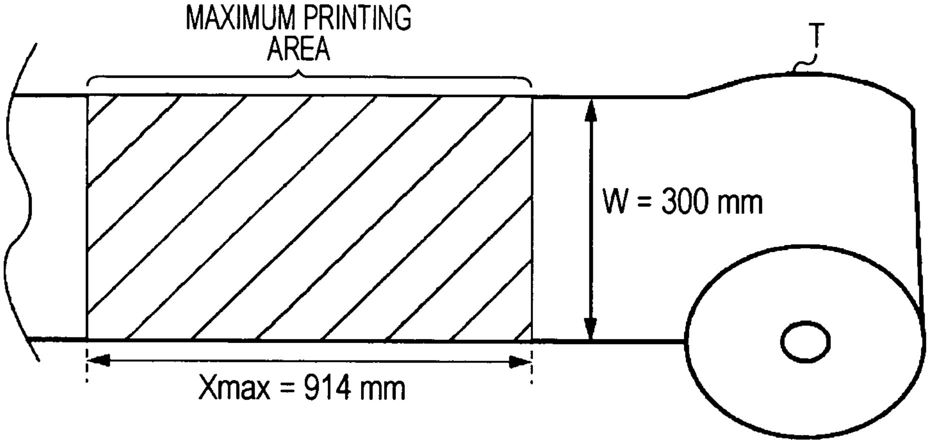
FIG. 5A is a view that shows the size of a print tape.
Figure 5B:
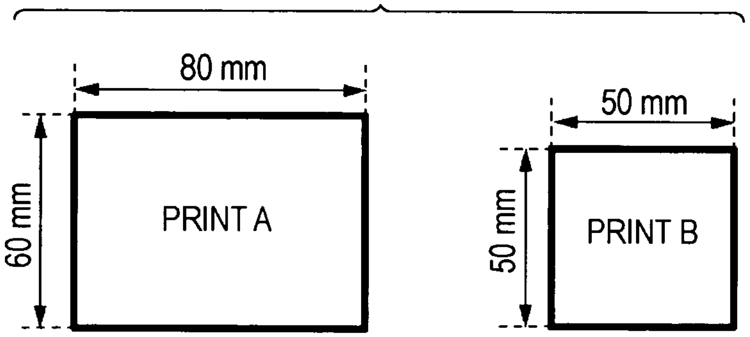
FIG. 5B is a view that shows the size of a print A and the size of a print B.

Next, a printing method by which prints of multiple types are printed will be described. FIG. 5A is a view that shows the size of a print tape T. FIG. 5B is a view that shows the size of a print A (first image) and the size of a print B (second image). Hereinafter, for description, the length W of the print tape T in the width direction is 300 mm, and the length Xmax in the transport direction of the maximum printing area that the printer 1 is able to print out through one image forming operation is 36 inches (=914 mm). Then, in the first example embodiment, it is assumed that the print data generation PC 60 receives two types of JOB data from the designing PC 70 so that the printer 1 prints out two types of prints (print A and print B). In addition, here, the size of the print A is "width direction x transport direction=60 mm×80 mm", and the size of the print B is "width direction x transport direction=50 mm×50 mm".

When the print data generation PC 60 has received two types of JOB data in this way, the layout software of the print data generation PC 60 determines how the two types of prints are printed. A printing method of a comparative example embodiment will be described first, and then a printing method of the first example embodiment will be described.

Printing Method of Comparative Example Embodiment

Figure 6A:
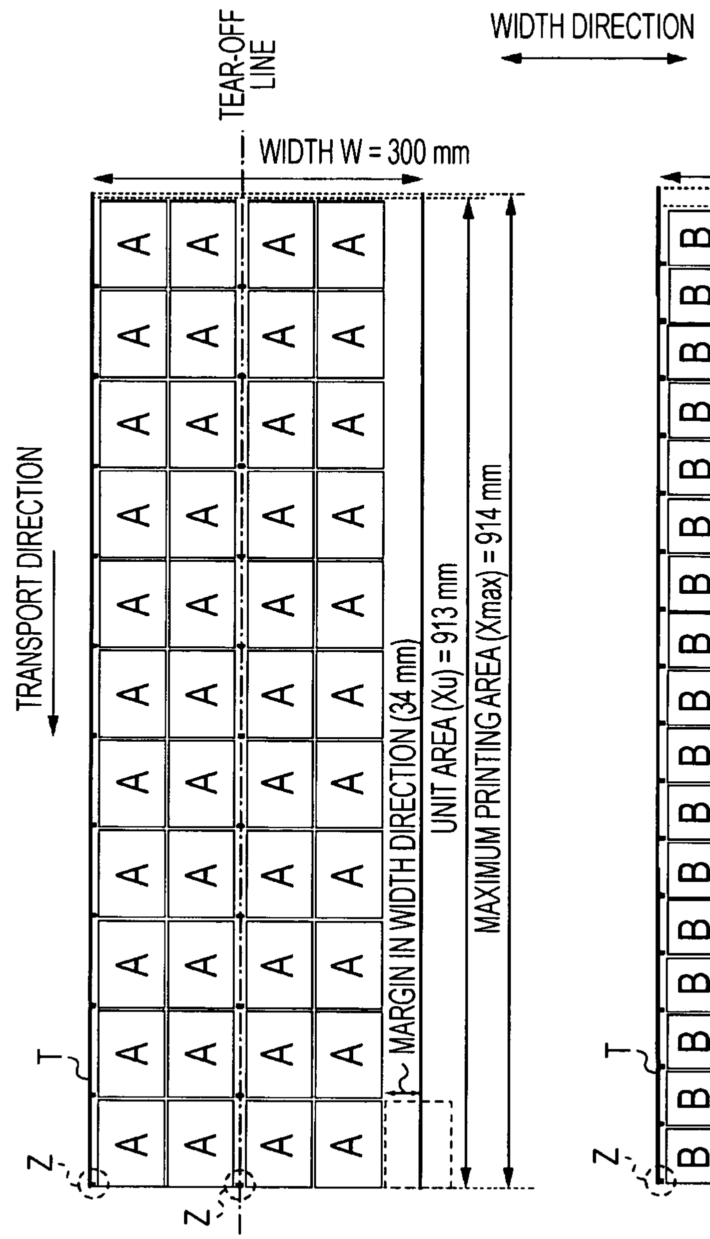
FIG. 6A and FIG. 6B are views, each of which shows that prints A and prints B are printed according to a comparative example embodiment.
Figure 6B:
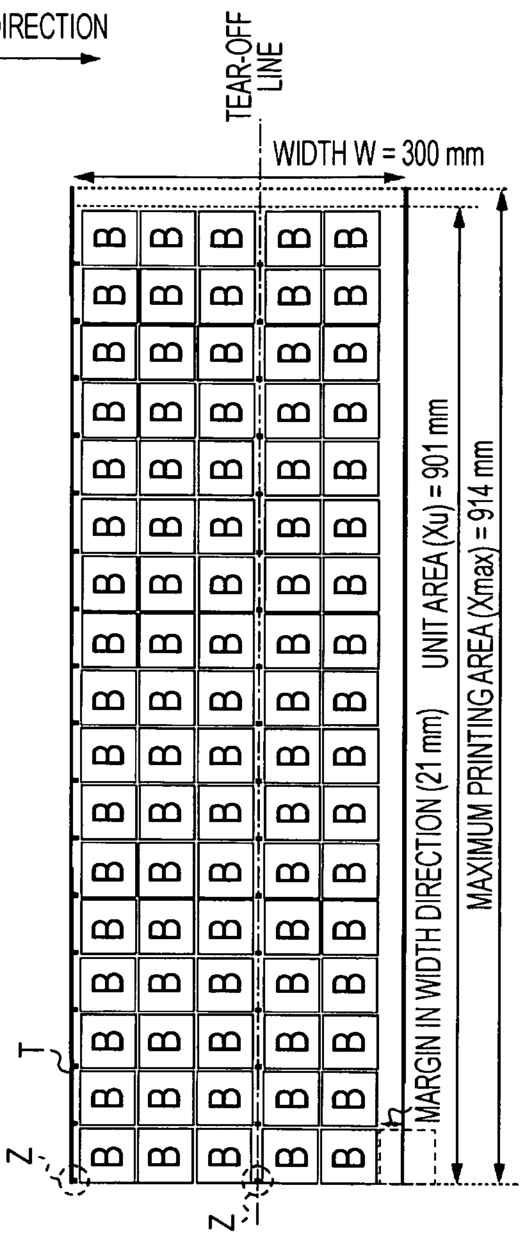

FIG. 6A and FIG. 6B are views, each of which shows that the prints A and the prints B are printed according to the comparative example embodiment. In the comparative example embodiment, as shown in the drawing, the prints A and the prints B are not printed at the same time, but the prints A and the prints B are separately printed. For this reason, the print data generation PC 60 generates two types of print data, that is, unit area print data for printing the prints A and unit area print data for printing the prints B.

To generate the unit area print data for printing the prints A, it is initially calculated how many prints A can be printed within the maximum printing area ($W \times Xmax = 300 \times 914$ ($mm^2$)). Note that, here, the minimum spacing Smin between the prints aligned in the transport direction is 3 mm. The number of prints A aligned in the transport direction within the maximum printing area is calculated as 11 through the following expression.

$$914 \div (80+3) = 11.012\ldots \approx 11$$

Then, from the number of the prints A aligned in the transport direction, the length by which the print tape T is fed through one transport operation, that is, the length Xu of the unit area in the transport direction is calculated as 913 mm.

$$83\times11=913\text{ (mm)}$$

Because the length of the print tape T in the width direction is 300 mm and the length of the print A in the width direction is 60 mm, as shown in FIG. 6A, a plurality of the prints A may be printed so that they are aligned in the width direction. The maximum spacing between the prints aligned in the width direction is 3 mm.

Incidentally, as described above, for half-cutting process after printing the prints, cutting marks Z that indicate the positions of the prints A are printed on the print tape T. Here, the length of each cutting mark Z in the width direction is 4 mm. In addition, the maximum cutting width (predetermined threshold) by which a cutting machine cuts in the width direction of the print tape T is 170 mm. The reason why the maximum cutting width of a cutting machine is set in this way is that, if the cutting width (cutting die) is excessively large, it is difficult to lower the cutting die parallel to the print tape T. If the cutting die is lowered obliquely, nonparallel to the print tape T, a force that acts on the print tape T varies with location. This may cause a portion of the prints (sticker paper) to stick to the cutting die or may cause a release paper to be cut together with a sticker paper despite a half-cutting process. For this reason, in order to reliably half-cut prints, the maximum cutting width is set.

Then, because the length in the width direction of the two prints A aligned in the width direction is 126 mm (=(60+3)×2) for the maximum cutting width 170 mm of the cutting machine, the two prints A may be half-cut by the cutting machine at the same time (126 mm<170 mm). On the other hand, three prints A aligned in the width direction cannot be half-cut by the cutting machine at the same time (the length in the width direction 189 mm>170 mm).

Thus, the print tape T on which the prints A have been printed is divided into two at the "tear-off line" shown in FIG. 6A by a cutter 80 shown in FIG. 2A and FIG. 2B. Then, the divided two print tapes T are half-cut one by one by the cutting machine. Thus, the cutting mark z only needs to be printed, in the width direction, one on the rear side with respect to the tear-off line of the print tape T and one on the front side with respect to the tear-off line. Note that the cutter 80 is movable in the width direction as shown in FIG. 2B. By so doing, even when the position of a tear-off line of the print tape T in the width direction varies depending on a difference in size of prints that are printed on the print tape T or a difference in the number of prints aligned in the width direction, the print tape T may be divided at a desirable position.

The number of prints A that are aligned in the width direction may be calculated as four through the following expression. If five prints A are aligned in the width direction, as shown hypothetically by the dotted lines, the fifth print A extends off the print tape T. Note that the spacing in the width direction between the cutting mark Z and the print A is also 3 mm.

$$\{300-(4+3)\times2\}\div(60+3)=4.539\ldots\approx4$$

Then, the margin length in the width direction may be calculated as 34 mm through the following expression.

$$300-(4+3)\times2-(60+3)\times4=34\text{ (mm)}$$

Consequently, the number of the prints A that are printed (in the unit area) through one image forming operation is 44 (=11×4). Then, the size of the unit area is "width direction×transport direction=300 mm×913 mm".

Similarly, as shown in FIG. 6B, the number of prints B that are printed through one image forming operation is 85(=17×5). Then, the size of the unit area is "width direction×transport direction=300 mm×901 mm", and the margin of the print tape T in the width direction is 21 mm. In addition, it is possible to half-cut up to three prints B aligned in the width direction (170>159(=53×3)) by the cutting machine at the same time. In this manner, in the comparative example embodiment, the prints A and the prints B are separately printed on the print tape T.

Incidentally, by adjusting the length by which the print tape T is fed through one transport operation, the length of the unit area in the transport direction may be changed in conformity to the size of a print. Thus, when one type of print is printed on the print tape T, the length Xu of the unit area in the transport direction may be determined in conformity to the length when an integer number of prints that can be printed in the maximum printing area are aligned at a minimum spacing Smin in the transport direction. Thus, an extra margin does not arise in the transport direction of the print tape T.

On the other hand, because the width of the print tape T is determined in advance, if one type of print (an integer number of prints) is aligned in the width direction within the maximum printing area, a margin is likely to arise in the width direction of the print tape T. In the comparative example embodiment, if only the prints A are printed on the print tape T, a margin of 34 mm arises in the width direction, and, if only the prints B are printed on the print tape T, a margin of 21 mm arises in the width direction. Such a margin increases the amount of print tape T consumed per the number of prints produced, which increases costs.

Then, the margin of the print tape T that arises when prints are printed is desirably minimized.

Printing Method of First Example Embodiment

Next, a printing method of the first example embodiment when the print data generation PC 60 receives two types of JOB data (print A and print B) will be described.

Figure 7:
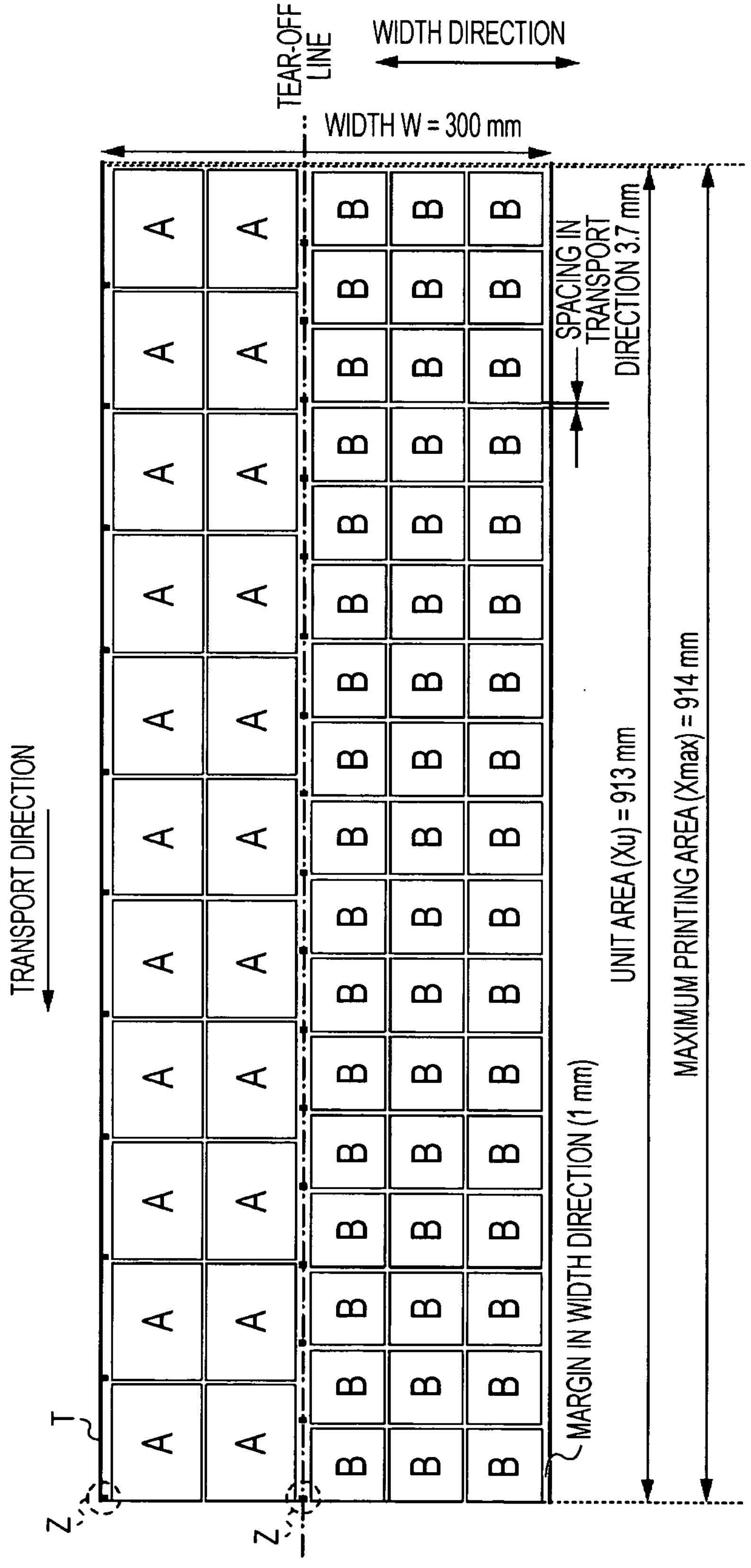
FIG. 7 is a view that shows that prints A and prints B, both of which are printed on a print tape.

FIG. 7 is a view that shows that the prints A and the prints B, both of which are printed on the print tape T, according to the present example embodiment. In the present example embodiment, the prints A and the prints B are printed so that the prints A and the prints B, which are different in size in the width direction and in the transport direction, are aligned in the width direction, and a plurality of the prints A and a plurality of the prints B are respectively aligned in the transport direction.

Hereinafter, the layout task of the prints A and the prints B will be specifically described. First, it is calculated how many prints A, of which the length in the transport direction is larger between the two types of prints, can be aligned in the transport direction within the maximum printing area. As shown in FIG. 7, 11 prints A can be aligned at a minimum spacing of Smin (first spacing) in the transport direction within the maximum printing area, the length of the unit area in the transport direction is 913 mm, and the length by which the print tape T is fed once in the transport direction is also 913 mm (the same as that of the comparative example embodiment).

Next, it is calculated how many prints B, of which the length in the transport direction is smaller than that of the print A, can be aligned in the transport direction within the unit area. Through the following expression, it is calculated that 17 prints B can be printed so that they are aligned in the transport direction.

$$913\div(50+3)=17.22\ldots\approx17$$

However, as in the case of the print A, if the spacing (second spacing) of the prints B in the transport direction is set to 3 mm, which is the minimum spacing Smin, an extra length arises in the transport direction within the unit area (913−53×17=12 mm). As a result, the prints B cannot be printed at equal spacings. Therefore, for the prints B, it is necessary to calculate a spacing in the transport direction, separately from the prints A. The spacing is calculated as 3.7 mm through the following expression.

$$\{913-(50\times17)\}\div17=3.705\ldots=3.7\ (\text{mm})$$

In this way, the layout software determines the size of the unit area (width direction×transport direction=300 mm×913 mm), and determines to perform printing so that, within the unit area, 11 prints A are aligned at the minimum spacing Smin (3 mm) in the transport direction and 17 prints B are aligned at a spacing of 3.7 mm in the transport direction. Note that the length of the spacing (first spacing) in the transport direction of the prints A of which the length in the transport direction is large is equal to or smaller than the length of the spacing (second spacing) in the transport direction of the prints B of which the length in the transport direction is small.

The print A of which the length in the transport direction is large is used as a reference to determine the length of the unit area in the transport direction. This is because using the print, of which the length in the transport direction is large, as a reference can reduce a margin in the transport direction. For example, when the length of the unit area in the transport direction is determined using the print B of which the length in the transport direction is small, and the prints A are placed in conformity to the unit area, it is assumed that, if the unit area has another 5-mm length in the transport direction, another print A can be placed within the unit area. In this case, the margin in the transport direction of an area in which the prints A are aligned is 75 mm (=80−5). On the other hand, when the unit area is determined using the print A as a reference and then the prints B are placed, and if, similarly, the unit area has another 5-mm length in the transport direction, another print B can be placed within the unit area, the margin of the unit area in the transport direction in which the prints B are aligned is 5 mm (=50−5). That is, setting the unit area using the print A of which the length in the transport direction is large as a reference produces a reduced amount of margin in the transport direction as compared with the case in which the unit area is set using the print B of which the length in the transport direction is small as a reference.

For further detailed description, as a comparative example embodiment, a printing method when the size of the unit area is determined using the print B, of which the length in the transport direction is smaller among the two types of prints, as a reference will be described. When the minimum spacing Smin of the prints B that are aligned in the transport direction is 3 mm, the number of prints B that are aligned in the transport direction within the maximum printing area is determined to be 17 (914÷(50+3)=17.245 . . . ). Then, the length of the unit area in the transport direction is 901 mm (=53×17). Next, the number of prints A that are aligned in the transport direction within the unit area is calculated as 10 through the following expression.

$$901\div(80+3)=10.855$$

Then, in order to align the prints A at equal spacings in the transport direction within the unit area, the spacing of the prints A in the transport direction is calculated as 10.1 mm through the following expression.

$$\{901-(80\times10)\}\div10=10.1\ (\text{mm})$$

Figure 8:
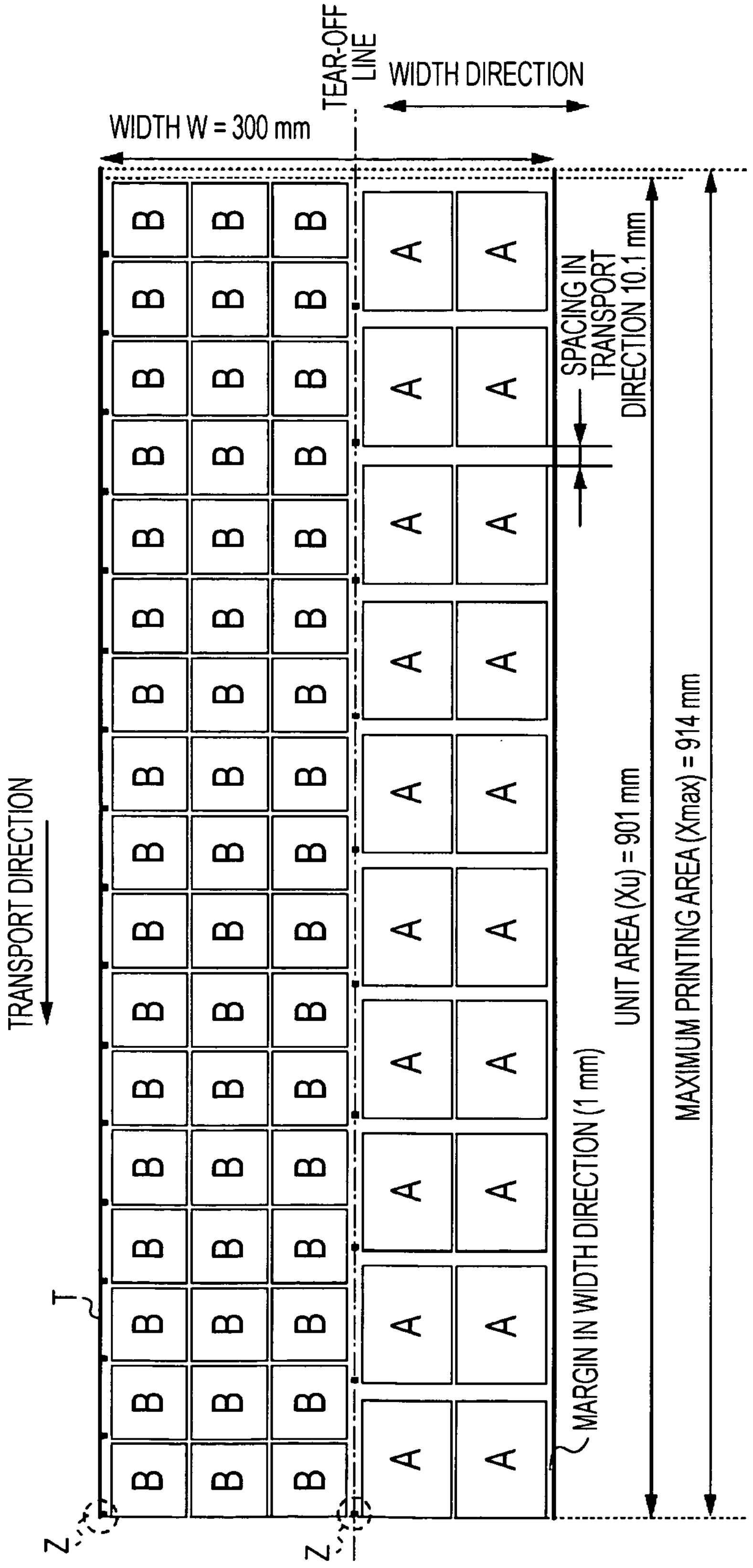
FIG. 8 is a view that shows printed prints A and prints B according to a comparative example embodiment.

FIG. 8 is a view that shows a state in which prints A and prints B are printed according to a comparative example embodiment. When the spacing in the transport direction of the prints that are not used as a reference to determine the length of the unit area in the transport direction is compared between the present example embodiment (FIG. 7) and the comparative example embodiment (FIG. 8), the spacing of the prints B in the transport direction is 3.7 (mm) in the present example embodiment, whereas the spacing of the prints A in the transport direction is 10.1 (mm) in the comparative example embodiment. That is, the present example embodiment produces a reduced amount of margin on the print tape T in the transport direction as compared with the comparative example embodiment.

Furthermore, in the present example embodiment, 11 prints A and 17 prints B are printed through one image forming operation, whereas in the comparative example embodiment, 10 prints A and 17 prints B are printed through one image forming operation. That is, the present example embodiment is able to increase the number of prints A printed through one image forming operation by one as compared with the comparative example embodiment. As a result, the present example embodiment is able to complete printing of the prints A as compared with the comparative example embodiment.

That is, by determining the size of the unit area using the print, of which the length in the transport direction is large, as a reference, it is possible to minimize the amount of margin in the transport direction of the print tape T, and it is also possible to increase the number of prints printed through one image forming operation.

Next, a way to arrange the prints A and the prints B in the width direction is determined. At this time, it is desirable to consider the cutting width of the cutting machine. In the present example embodiment, because the maximum cutting width of the cutting machine is set to 170 mm, two prints A that are aligned in the width direction may be half-cut at the same time, and three prints B that are aligned in the width direction may be half-cut at the same time. Then, the layout software determines to perform printing so that two prints A are aligned in the width direction of the unit area and three prints B are aligned in the width direction of the unit area. As a result, the margin of the unit area in the width direction is calculated as 1 mm through the following expression.

$$300-(4+3)\times2-(60+3)\times2-(50+3)\times3=1\ (\text{mm})$$

In this way, in the first example embodiment, by printing two types of the prints A and the prints B on the print tape T at the same time so that they are aligned in the width direction, it is possible to set the margin of the unit area in the width direction to 1 mm, which is smaller than the margins (34 mm and 21 mm) in the width direction of the comparative example embodiment.

Consequently, when JOB data regarding two types of prints having different sizes are received, one type of print is printed separately from another type of print as in the case of the comparative example embodiment, whereas two types of prints are printed so that they are aligned in the width direction. In the first example embodiment, the printing method (print producing method) that prints two types of prints so that they are aligned in the width direction is able to reduce a margin in the width direction as compared with the printing method of the comparative example embodiment.

Conversely, if the prints A and the prints B are separately printed, to perform printing with a minimized margin, it is necessary to use the print tape T having a width that conforms to the size of a print. For example, as in the case of the comparative example embodiment shown in FIG. 6A and FIG. 6B, in which the prints A and the prints B are separately printed, to reduce a margin in the width direction of the print tape T, it is necessary to prepare a print tape of which the length in the width direction is 266 mm (=300−34) for printing the prints A and a print tape of which the length in the width direction is 279 mm (=300−21) for printing the prints B. In contrast, in the first example embodiment, because the amount of margin is minimized by printing the prints A and the prints B on the print tape T having a preset width so that they are aligned in the width direction, it is not necessary to stock print tapes T having different widths.

In addition, in the comparative example embodiment, because the prints A and the prints B are separately printed, two types of image data, that is, the unit area image data (FIG. 6A) for the prints A and the unit area image data (FIG. 6B) for the prints B must be converted by the printer driver into print data that the printer 1 is able to print. On the other hand, in the first example embodiment, because the prints A and the prints B are printed at the same time, it is only necessary to convert one type of unit area image data (FIG. 7) into print data. The first example embodiment reduces operating time during which image data are converted into print data and, as a result, reduces overall print processing time, as compared with the comparative example embodiment.

Then, in the first example embodiment, when the prints A and the prints B are aligned in the width direction within the unit area (FIG. 7), the maximum cutting width of the cutting machine is also considered. That is, the length in the width direction of the two prints A that are aligned in the width direction and the length in the width direction of the three prints B that are aligned in the width direction are smaller than the maximum cutting width. Thus, as shown in FIG. 7, when the prints A and the prints B are printed, it is possible to half-cut two prints A aligned in the width direction at a time, and it is possible to half-cut three prints B aligned in the width direction at a time.

For example, when there are two cutting machines, after the prints A and the prints B are printed together on the print tape T at the same time as in the case of the first example embodiment, one of the cutting machines is set with a cutting die for the prints A and the other cutting machine is set with a cutting die for the prints B to thereby perform half-cutting the prints A and the prints B at the same time. On the other hand, as in the case of the comparative example embodiment, when the prints A are printed and then the prints B are printed, after the printing of the prints A is complete, two cutting machines are respectively set with cutting dies for the prints A to perform half-cutting of the prints A, while in the meantime, the prints B are printed and then the printing of the prints B is complete, the cutting dies for the prints A are removed from the two cutting machines and cutting dies for the prints B are set to thereby perform half-cutting of the prints B. Because work for setting a cutting die of the cutting machine takes time, by minimizing the number of settings of a cutting die as in the case of the first example embodiment, it is possible to reduce overall working hours. In addition, when two types of prints are separately printed on the print tape T as in the case of the comparative example embodiment, to reduce the number of settings of a cutting die, a cutting die for the prints A is set on one of the cutting machines, and a cutting die for the prints B is set on the other cutting machine. In this case, after the printing of the prints A is complete, one cutting machine may perform half-cutting of the prints A; however, because the printing of the prints B is not complete, the other cutting machine is not allowed to operate. That is, by printing the prints A and the prints B on the print tape T at the same time, in the half-cutting process after completion of printing, it is possible to reduce time or effectively use a cutting machine.

In the first example embodiment, by performing printing on the print tape T so that two types of the prints A and the prints B having different sizes are aligned in the width direction, the margin of print tape T is reduced as compared with the case in which two types of prints are separately printed on the print tape T. However, the sizes of the prints and the length of the print tape T in the width direction are various. Thus, if the printing process that separately prints out two types of prints produces a reduced margin of the print tape T as compared with the printing process that prints out two types of prints aligned in the width direction, it is desirable to print two types of prints separately.

However, when two types of prints are separately printed as in the case of the comparative example embodiment, although one type of the print may be printed on the print tape T so as to be aligned in the width direction with a reduced margin, the other type of print may possibly be printed with a large amount of margin because of a size different from the one type of the print. Thus, when two types of prints are printed, it is presumable that the manner, in which the two types of prints are printed on the print tape T so that they are aligned in the width direction as in the case of the first example embodiment, has a high probability of producing a reduced margin.

That is, when one type of print is printed on the print tape T having a prescribed width W as in the case of the comparative example embodiment, the amount of margin produced on the print tape T cannot be changed. However, when two types of prints having different sizes (in the width direction) are aligned on the print tape T, it is possible to change the amount of margin through a way to align the prints in the unit area to thereby minimize the margin.

Then, the maximum cutting width of a cutting die is considered when the prints A and the prints B are arranged in the width direction within the unit area, but it is not limited to it. Instead, the layout software may variously change a way to arrange the prints A and the prints b in the width direction, and then may select a way of arrangement by which the amount of margin is minimized. At this time, a way of arrangement that one type of print is aligned in the width direction as in the case of the comparative example embodiment may be set for one of the choices, and, when a manner to print out one type of print so that they are aligned in the width direction minimizes the amount of margin, printing is performed so that only one type of the print is aligned in the width direction of the print tape T.

Printing Multiple Types of Prints: Second Example Embodiment

In the second example embodiment, when multiple types (four types) of prints are printed, the layout software combines different types of prints that are printed so that they are aligned in the width direction of the print tape T, determines a combination that minimizes the amount of margin produced on the print tape T, and then the printer 1 performs printing on the basis of the determined combination.

Figure 9:
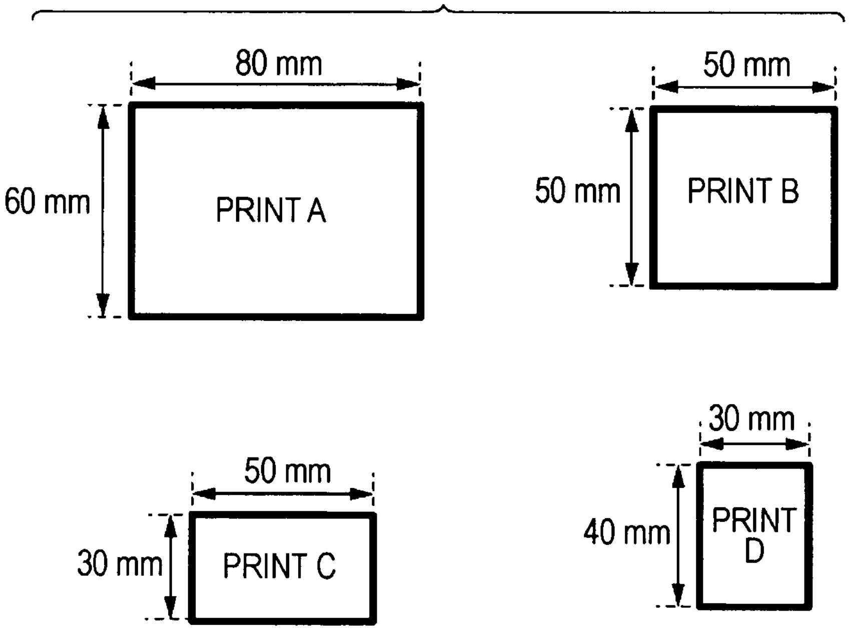
FIG. 9 is a view that shows four types of prints that are printed by the printer.

FIG. 9 is a view that shows four types of prints (print A to print D) that are printed by the printer 1. A process in which the layout software determines a printing process that minimizes the margin will be described. However, for easier description, prints are printed on the print tape T in units of two types, and a manner to print three or four types of prints aligned in the width direction or a printing process that aligns only one type of print in the width direction is omitted. Thus, from among the following three types of printing processes, a printing process that minimizes the margin is determined. A first printing process prints out the prints A and the prints B so that they are aligned in the width direction and prints out the prints C and the prints D so that they are aligned in the width direction. A second printing process prints out the prints A and the prints C so that they are aligned and prints out the prints B and the prints D so that they are aligned. A third printing process prints out the prints A and the prints D so that they are aligned and prints out the prints B and the prints C so that they are aligned.

Figure 10A:
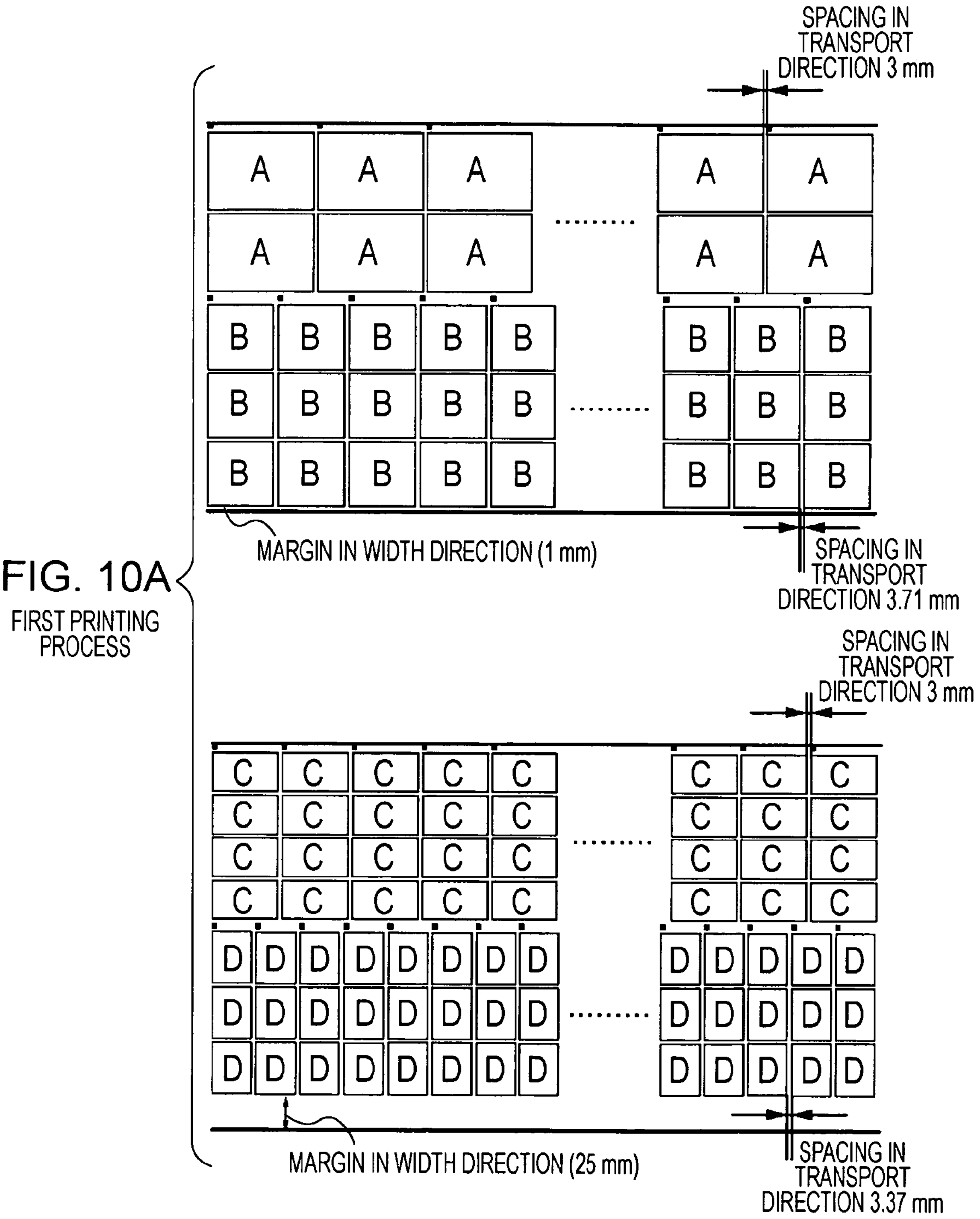
FIG. 10A is a view that shows a way to arrange prints in a first printing process.
Figure 10B:
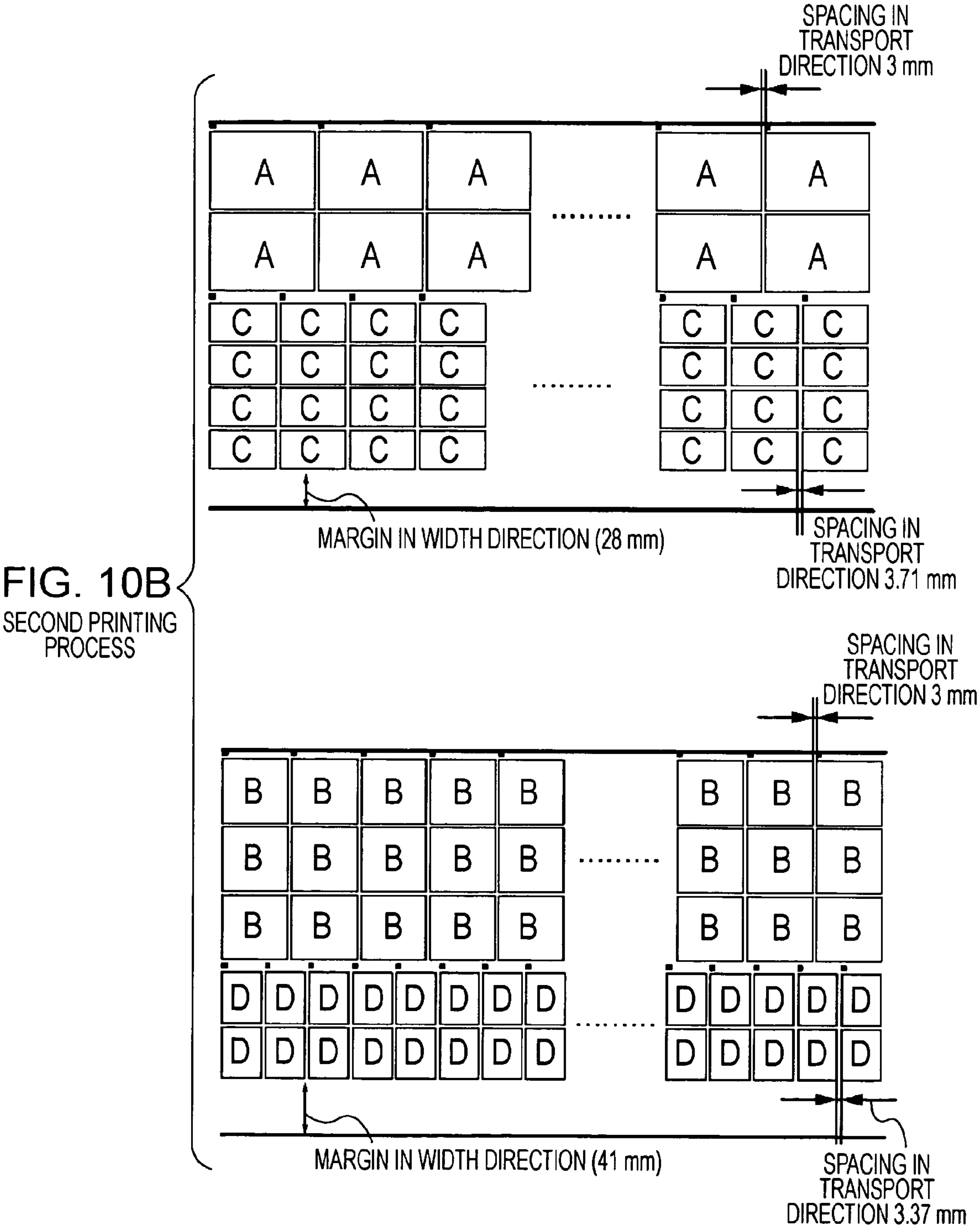
FIG. 10B is a view that shows a way to arrange prints in a second printing process.
Figure 10C:
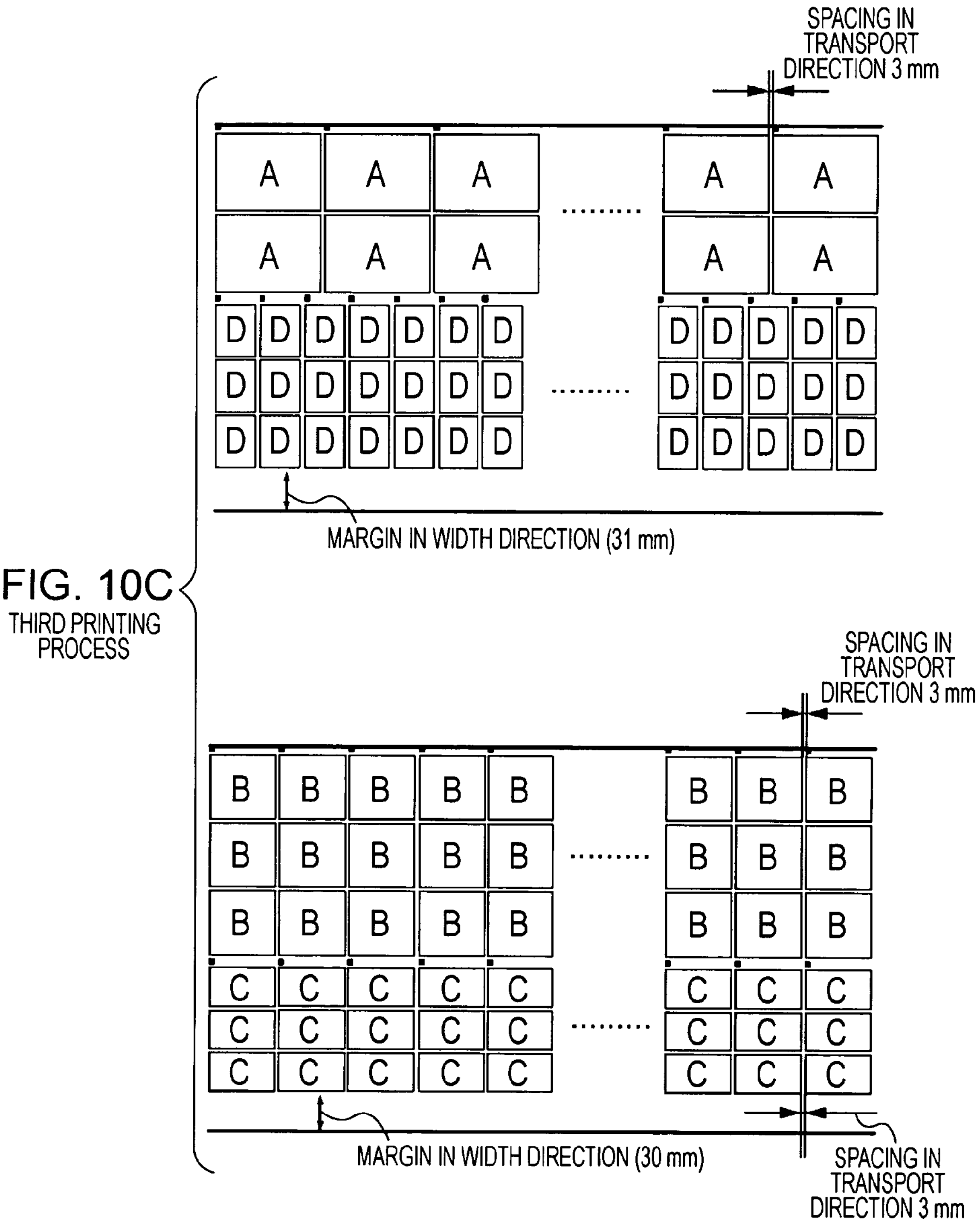
FIG. 10C is a view that shows a way to arrange prints in a third printing process.

FIG. 10A to FIG. 10C are views that show manners to arrange the prints in the first printing process to the third printing process. FIG. 11 is a table that shows results obtained by calculating the amounts of margins in the respective printing processes. A manner to arrange two types of prints on the print tape T is similar to that of the first example embodiment. For example, in the case of the manner of the first printing process to arrange the prints C and the prints D (FIG. 10A), the length (=feeding length=901 mm) of the unit area in the transport direction is determined using the prints C, of which the length in the transport direction is large, as a reference. Next, in conformity to the length of the unit area in the transport direction, it is calculated how many prints D are printed so that they are aligned in the transport direction, and the spacing (=3.37 mm) in the transport direction is calculated so that the prints D are aligned at equal spacings in the transport direction within the unit area.

Then, the prints C and the prints D are aligned in the width direction so that the length in the width direction of the plurality of prints C aligned in the width direction and the length in the width direction of the plurality of prints C aligned in the width direction do not exceed the maximum cutting width (=170 mm) of the cutting machine. Note that irrespective of the maximum cutting width, the prints C and the prints D may be aligned in the width direction so as to minimize the amount of margin in the width direction. In this way, as shown in FIG. 10A to FIG. 10C, in each of the printing processes, it is determined how the prints are printed within the unit area.

Next, a method of calculating the amount of margin will be described by taking the case in which the prints C and the prints D of the first printing process are printed, for example. When two types of prints are printed on the print tape T so that they are aligned in the width direction, it is necessary to consider both the amount of margin in the width direction and the amount of margin in the transport direction. This is because the prints (prints C) of which the length in the transport direction is large are printed so that they are aligned at the minimum spacings Smin in the transport direction; however, the spacings in the transport direction of the prints (prints D) of which the length in the transport direction is small are determined in conformity to the length of the unit area in the transport direction. For this reason, it is desirable that the spacing in the transport direction is a value approximate to the minimum spacing Smin as much as possible.

Then, in the second example embodiment, the area of margin in the transport direction is calculated on the basis of a difference between the case in which the prints D of which the length in the transport direction is smaller between the two types of prints are aligned in the transport direction at the minimum spacing Smin (=3 mm) and the case in which the prints D are aligned in the transport direction at a spacing (=3.37 mm) that is calculated in conformity to the unit area.

$$(\text{Area of a margin in the transport direction})=(\text{Difference between spacings})\times(\text{Length of print } D \text{ in the width direction})\times(\text{Number of prints } D)=(3.37-3)\times 40\times(27\times 4)=1{,}199\ (\text{mm}^2)$$

Then, the amount of margin (area of margin) in the width direction is calculated by multiplying the length of margin 25 mm (=300−(4+3)×2−(30+3)×4−(40+3)×3) when the prints C and the prints D are aligned in the width direction on the print tape T and the feeding length 901 mm of one transport operation, as shown in the following expression.

$$(\text{Area of margin in the width direction})=25\ (\text{mm})\times 901\ (\text{mm})=22{,}525\ (\text{mm}^2)$$

After that, by adding up the area of margin in the transport direction and the area of margin in the width direction, the area of margin when the prints C and the prints D are printed on the print tape T so that they are aligned in the width direction is calculated.

In this way, as shown in FIG. 11, the layout software determines that the first printing process is a process that minimizes the area of margin from among the first to third printing processes. Then, the layout software generates unit area image data so that the prints are printed as shown in FIG. 10A (first printing process). The printer driver converts the unit area image data into unit area print data, and the printer 1 performs printing using the unit area print data repeatedly.

In this way, when the multiple types of prints are printed, there are various printing processes, some print out multiple types of prints so that they are aligned in the width direction and others print out one type of prints. At this time, by selecting a printing process that minimizes the amount of margin as in the case of the second example embodiment, it is possible to suppress the amount of the print tape T consumed and reduce costs.

Printing Multiple Types of Prints: Third Example Embodiment

In the above described first and second example embodiments, the maximum cutting width (=170 mm) of a cutting machine is considered when prints are aligned in the width direction, and two types of prints are printed so that they are aligned in the width direction so as to minimize the amount of margin in the width direction; however, it is not limited to it.

Here, in the second printing process shown in FIG. 10B, the prints B and the prints D are printed on the print tape T so that they are aligned in the width direction, the length of margin in the width direction is 41 mm. The print B having a length of 50 mm in the width direction or the print D having a length of 40 mm in the width direction cannot be printed in the margin area with leaving a spacing for cutting process. However, the print C having a length of 30 mm in the width direction may be printed.

That is, the prints (prints B or prints D, corresponding to first images) of which the length in the width direction is large are arranged so as to align in the width direction first, and then the prints (prints C, corresponding to second images) of which the length in the width direction is small are arranged in the margin area after the prints of which the length in the width direction is large are arranged. This can reduce a margin in the width direction.

Printing Multiple Types of Prints: Fourth Example Embodiment

In the above described example embodiments, the length of the unit area in the transport direction is determined on the basis of the maximum number of prints that can be printed within the maximum printing area, but it is not limited to it. In FIG. 7, the length of the unit area in the transport direction is determined on the basis of 11 prints A that can be aligned in the transport direction within the maximum printing area. However, it is not limited to it. For example, when the spacing of the prints B in the transport direction reduces (margin in the transport direction reduces) by determining the length of the unit area in the transport direction on the basis of a small number (X) of the prints A as compared with on the basis of the maximum number of the prints A, the length of the unit area in the transport direction may be determined on the basis of X prints A. However, when the length of the unit area in the transport direction is largely reduced as compared with that of the maximum printing area, the number of prints that are printed through one image forming operation reduces, so that print time increases.

Other Example Embodiments

The above described example embodiments describe a printing system that mainly includes an ink jet printer, and also describe a method of arranging images, or the like. In addition, the above example embodiments make it easy to understand the aspects of the invention, but they do not intend to limit the scope of the invention. The aspects of the invention also include modifications and improvements without departing from the spirit of the invention and, of course, include the equivalents of them. Particularly, embodiments described below may also be included in the aspects of the invention.

Prints

In the above example embodiments, prints (images) are printed on a print tape that has an adhesive surface on the back face, but it is not limited to it. For example, when tags having different sizes are printed on a continuous heavy paper so that they are aligned in the width direction, the size of a unit area is determined on the basis of the tags of which the length in the transport direction is large, and the tags of which the length in the transport direction is large are initially arranged. This may minimize a margin of the heavy paper. In addition, the continuous medium is not limited to a paper, such as a print tape. Prints may be printed on a cloth, a film, or the like.

Printing Apparatus

In the above example embodiments, the print data generation PC executes a layout task to determine how prints are printed on a print tape and a conversion process to convert image data into print data, and the printing system, in which the ink jet printer and the print data generation PC are connected, may be regarded as the printing apparatus, but it is not limited to it. When the printer has the functions of the layout software and the printer driver, the printer by itself may be regarded as the printing apparatus.

In addition, the above described printer 1 prints out an image in such a manner that the heads 41 are moved in the transport direction within the printing area and the heads 41 (X-axis stage) are further moved in the width direction, but it is not limited to it. For example, when heads have nozzles that are aligned over the length of the printing area in the transport direction, the heads just need to move in the width direction to print out an image without moving in the transport direction. In addition, when the heads have nozzles that are aligned over the length of a continuous medium in the width direction, the heads just need to move in the transport direction to print out an image through one image forming operation without moving in the width direction. In addition, because the length of a continuous medium in the width direction varies depending on types, some continuous media have a length in width that is smaller than the nozzle array length in the width direction and, therefore, the heads need not to move in the width direction; however, other continuous media have a length in width that is larger than the nozzle array length in the width direction and, therefore, the heads need to move in the width direction. Thus, movement of the heads may be changed depending on a continuous medium.

The above described example embodiments describe the ink jet printer as an example of the printing apparatus, and a method to discharge ink from nozzles may be a piezoelectric type in which a voltage is applied to a driving element (piezoelectric element) and an ink chamber is expanded or contracted by the driving element to thereby discharge ink, or may be a thermal jet type in which bubbles are generated in a nozzle using a heater element and ink is discharged by the bubbles. In addition, the printing apparatus is not limited to the ink jet printer, but it may be, for example, a thermal imprint printer or a dot-impact printer.

What is claimed is:

1. A printing method that alternately repeats a transport operation that transports a continuous medium in a transport direction and an image forming operation that moves a head to form an image to thereby print out a first image and a second image, which has a smaller length in the transport direction than the first image, on the continuous medium, the printing method comprising:

setting a unit area, which is equal to or smaller than the size of a printing area that is printable through the one image forming operation, on the basis of the printable printing area and the size of the first image;

generating print data for the unit area by setting an integer number of first images and second images to minimize at least one margin, such that, within the unit area, the integer number of the first images are aligned at a first spacing in the transport direction, the integer number of the second images are aligned at a second spacing in the transport direction, and the integer number of the first images aligned in the transport direction and the integer number of the second images aligned in the transport direction are printed so as to be aligned in a width direction that intersects with the transport direction; and performing printing using the print data repeatedly so that, on the continuous medium, a plurality of the first images are aligned at the first spacing in the transport direction and a plurality of the second images are aligned at the second spacing in the transport direction, wherein, when the print data are generated, after setting the integer number of the first images, of which the length is larger in the width direction than the second images, that are printed so as to be aligned in the width direction, the integer number of the second images that are printed so as to be aligned in the width direction is set, wherein the length of the first spacing is equal to or smaller than length of the second spacing.

2. The printing method according to claim 1, wherein the integer number of the first images that are printed so as to be aligned in the width direction is determined so that the total of the lengths in the width direction of the first images that are aligned in the width direction is smaller than a predetermined threshold.

3. The printing method according to claim 1, wherein, when multiple types of images are printed, combinations of the types of images to be printed on the continuous medium are selected from among the multiple types of images, wherein the amount of margin that remains when images are printed on the continuous medium is calculated for each combination, and wherein printing is performed on the basis of the combination of which the amount of margin is minimal.

4. The printing method according to claim 1, further comprising setting a margin of the unit area in the width direction to 1 mm.

5. A printing apparatus that alternately repeats a transport operation that transports a continuous medium in a transport direction and an image forming operation that moves a head to form an image to thereby print out a first image and a second image, which has a smaller length in the transport direction than the first image, on the continuous medium, the printing apparatus comprising:

a unit area setting unit that sets a unit area, which is equal to or smaller than a size of a printing area that is printable through the one image forming operation, on the basis of the printable printing area and the size of the first image;

a print data generation unit that generates print data for the unit area by setting an integer number of first images and second images to minimize at least one margin, such that, within the unit area, the integer number of the first images are aligned at a first spacing in the transport direction, the integer number of the second images are aligned at a second spacing in the transport direction, and the integer number of the first images aligned in the transport direction and the integer number of the second images aligned in the transport direction are printed so as to be aligned in a width direction that intersects with the transport direction; and a printing unit that performs printing using the print data repeatedly so that, on the continuous medium, a plurality of the first images are aligned at the first spacing in the transport direction and a plurality of the second images are aligned at the second spacing in the transport direction, wherein, when the print data are generated, after setting the integer number of the first images, of which the length is larger in the width direction than the second images, that are printed so as to be aligned in the width direction, the integer number of the second images that are printed so as to be aligned in the width direction is set, wherein the length of the first spacing equal to or smaller than the of the second spacing.

6. The printing method according to claim 5, further comprising setting a margin of the unit area in the width direction to 1 mm.

7. A print producing method that alternately repeats a transport operation that transports a continuous medium in a transport direction and an image forming operation that moves a head to form an image to thereby print out a first print and a second print, which has a smaller length in the transport direction than the first print, on the continuous medium, the print producing method comprising:

setting a unit area, which is equal to or smaller than a size of a printing area that is printable through the one image forming operation, on the basis of the printable printing area and the size of the first print;

generating print data for the unit area by setting an integer number of first images and second images to minimize at least one margin, such that, within the unit area, the integer number of the first prints are aligned at a first spacing in the transport direction, the integer number of the second prints are aligned at a second spacing in the transport direction, and the integer number of the first prints aligned in the transport direction and the integer number of the second prints aligned in the transport direction are printed so as to be aligned in a width direction that intersects with the transport direction; and performing printing using the print data repeatedly so that, on the continuous medium, a plurality of the first prints are aligned at the first spacing in the transport direction and a plurality of the second prints are aligned at the second spacing in the transport direction, wherein, when the print data are generated, after setting the integer number of the first images, of which the length is larger in the width direction than the second images, that are printed so as to be aligned in the width direction, the integer number of the second images that are printed so as to be aligned in the width direction is set, wherein the length of the first spacing is equal to or smaller than the length of the second spacing.

8. The printing method according to claim 7, further comprising setting a margin of the unit area in the width direction to 1 mm.

* * * * *